United States Patent [19]

Barak

[11] Patent Number: 4,866,877

[45] Date of Patent: Sep. 19, 1989

[54] VERTICAL WALL MOUNT INSECT TRAP

[75] Inventor: Alan V. Barak, Basking Ridge, N.J.

[73] Assignee: The United States of America as represented by the Secretary of Agriculture, Washington, D.C.

[21] Appl. No.: 247,474

[22] Filed: Sep. 22, 1988

[51] Int. Cl.[4] .............................................. A01M 1/00
[52] U.S. Cl. .................................... 43/121; 43/132.1
[58] Field of Search ................. 43/114, 121, 107, 131, 43/132.1

[56] References Cited

U.S. PATENT DOCUMENTS 2,123,995  7/1938  Harroun .
2,253,541  8/1941  Torbett .................................. 43/108
4,227,333 10/1980  Levinson et al. ..................... 43/107
4,581,845  4/1986  Burkholder et al. ................. 43/107

Primary Examiner—M. Jordan
Attorney, Agent, or Firm—M. Howard Silverstein; John D. Fado; Curtis P. Ribando

[57] ABSTRACT

A vertical mount trap for monitoring and control of insects, especially Trogoderma granarium (khapra beetle) and other stored-product pests of the order Coleoptera; comprising a housing device, a pitfall chamber within the housing device, an attractant, and a protective jacket having vents and flaps designed to facilitate entry to the housing device from a vertical surface in a pest control area.

14 Claims, 2 Drawing Sheets

4,866,877

VERTICAL WALL MOUNT INSECT TRAP

BACKGROUND OF THE INVENTION

Field of the Invention

Insect control in marketing has as its major objective the reduction of losses caused by insects to harvested agricultural commodities and their processed or manufactured products throughout the entire marketing channels and until they are utilized by the final consumer. Products intended for human consumption, such as dry milk, flour, nuts, spices, dried fruits, and processed cereals, are commodities that must be entirely free of living or dead insects or evidence of their presence. Loss of food and food products in storage and in transit due to pests is significant. More effective control of storage pests, particularly in large granaries, small farm storages, ships, and warehouses, could mean an immediate increase in the world's edible grain and food without any change in agricultural productivity.

Several new techniques for controlling stored-product insects have been devised in recent years. These new methods include modified atmospheres, radiation, pathogens, growth regulators, and pheromones, all of which can be combined with the older methods of control, such as sanitation, inspection, good packaging, storage facilities, and pesticides, to achieve an integrated approach to the control of stored-product insects.

Pheromones and other attractants are especially promising against low populations of stored-product insects that, nevertheless, exceed the populations tolerated in food products. In such situations, habitats are usually restricted, and the insects typically populate small foci that expand only gradually. Simple, inexpensive traps baited with insect pheromones or attractants would be useful for monitoring such insects in order to estimate population levels, identify problem species, and initiate efficient control measures.

One insect of particular interest to control programs is the khapra beetle, *Trogoderma granarium* Everts. The khapra beetle is a serious pest of stored grain and grain products in many hot, arid countries including India and countries in the Mideast, Medeterranean, and Northeast Africa regions. This pest may also consume or contaminate spices, gums, seeds, dried fruits, and various dried plant and animal materials, and be present in the packing materials for non-host cargoes.

In the United States the khapra beetle is a quarantine insect, and the U.S. Department of Agriculture (USDA) has in effect regulations governing the importation of certain commodities and items from 25 countries considered infested by khapra beetle. USDA inspectors routinely examine products from these countries for the presence of the khapra beetle. In addition, vessels, warehouses, and other establishments which receive or distribute these products or have had a history of khapra beetle detections are periodically examined for evidence of infestation.

This invention relates to a trap designed for use in insect control programs, especially those designed to monitor and control stored-product pests.

Description of the Prior Art

Interest in the use of traps to detect and monitor stored-product Coleoptera and in stored-product pest management programs has steadily increased, particularly during the last decade. The use of corrugated traps with wheat flour bait to trap *Tribolium confusum* Jacquelin duVal was reported by DeCoursey [J. Econ. Entomol. 24: 1079-1081 (1931)]. Wilson [J. Econ. Entomol. 33: 651-653 (1940)] utilized sticky traps treated with alcoholic fish meal extracts for trapping carpet beetle (Dermestidae) larvae in houses. Sticky traps have met with only limited success in that they do not rapidly kill the insects and the level of adhesive required to prevent escapes tends to have a repellent effect. Also, in monitoring programs, insects are difficult to remove from sticky traps for examination.

Dermestid pheromones applied to 4-layer, 9-cm square corrugated paper traps [Burkholder, In Insect Pheromones and Their Applications, T. Kono and S. Ishii (eds.), pp. 111-122 (1976); Barak et al., Environ. Entomol. 5: 111-114 (1976); and Levinson et al., U.S. Pat. No. 4,227,333] were used to detect *Attagenus unicolor* (Brahm) [=megatoma (F.)] and *Trogoderma inclusum* LeConte. Insects lured to the trap were killed by malathion insecticide applied to the trap. This device demonstrated seasonal emergence and distribution of these insects in a grain elevator, milling company, and warehouse. This trap was used as a basis for an improved design of a flat floor trap [Barak et al., Agriculture, Ecosystems and Environment 12: 207-218 (1984/1985); Burkholder et al., U.S. Pat. No. 4,581,845]. The improved device incorporated up to four septa pheromone lures and attractant oils in a pitfall chamber, in which the attractant oils also served to kill trapped adults and larvae by suffocation. Adult *Oryzaephilus surinamensis* (L.), *Tribolium confusum* Jacquelin duVal, and larval *Trogoderma variabile* Ballion were successfully caught by this trap. However, its utility has been somewhat limited by its susceptibility to rodent damage, crushing by equipment, and inadvertent removal or dislocation by workers.

In regard to trapping the khapra beetle, the female sex pheromone of this pest has been identified as 14-methyl-8-hexadecenal in a 92Z:8E isomeric ratio [Cross et al., J. Chem. Ecol. 2: 457-468 (1976)] and is available commercially in lures of different types. Natural or synthetic food attractants for the khapra beetle larvae have been reported [Bar-Zeev, Israel J. Entomol. 11: 61-72 (1976); Bar-Zeev, Riv. Parassit. 40: 49-55 (1979)].

Summary of the Invention

I have now invented an improved trap for insects, especially for the khapra beetle and other stored-product pests of the order Coleoptera. The trap is designed to be mounted on a vertical surface and comprises a housing device, a pitfall chamber substantially concealed within the housing device for capturing insects and having a mouth at the top thereof, a plurality of passages adapted to render the mouth of the pitfall chamber accessible to the insects from the vertical surface, an attractant for the insects in the locus of the pitfall chamber, and a jacket adapted to extend over at least four sides of the housing device while providing access by said insects to the passages from the vertical surface.

In accordance with this discovery, it is an object of the invention to provide a poisonless insect trap which offers a potential alternative to frequent blanket application of pesticides, thus reducing the costs and risks of insecticide contamination.

It is also an object of the invention to design a trap which can be reliably used for both monitoring and controlling insect pests, especially those of stored products.

Another object of the invention is to provide a trap designed to take advantage of any of several insect behavioral patterns; and which can also be tailored for capturing either adults or larvae, and either a broad or narrow range of species.

Still another object of the invention is to develop an inexpensive trap which is easily produced, assembled, installed, and maintained.

Yet another object of the invention is to produce a trap for insect pests which is unobtrusive and safe for use in the vicinity of stored foods and food products.

Other objects and advantages of this invention will become readily apparent from the ensuing description.

BRIEF DESCRIPTION OF THE DRAWINGS

FIGS. 1-5 illustrate a preferred embodiment of the invention.

FIG. 1 is a perspective view of the trap in a partially unfolded position.

FIG. 2 is a top view of the unfolded housing device.

FIG. 3 is a top view of the partially folded housing device.

FIG. 4 is a perspective view of the back side of the trap jacket.

FIG. 5 is a detailed fragment view of the assembled trap without the jacket.

DETAILED DESCRIPTION OF THE INVENTION

The vertical mount insect trap of the present invention constitutes a unique combination of cooperating elements including a pitfall chamber, a housing device for the pitfall chamber, a jacket for supporting the housing device and facilitating access by the target insects, an attractant, and optionally a substance for sequestering or killing the insects captured in the pitfall chamber.

Figure 1:
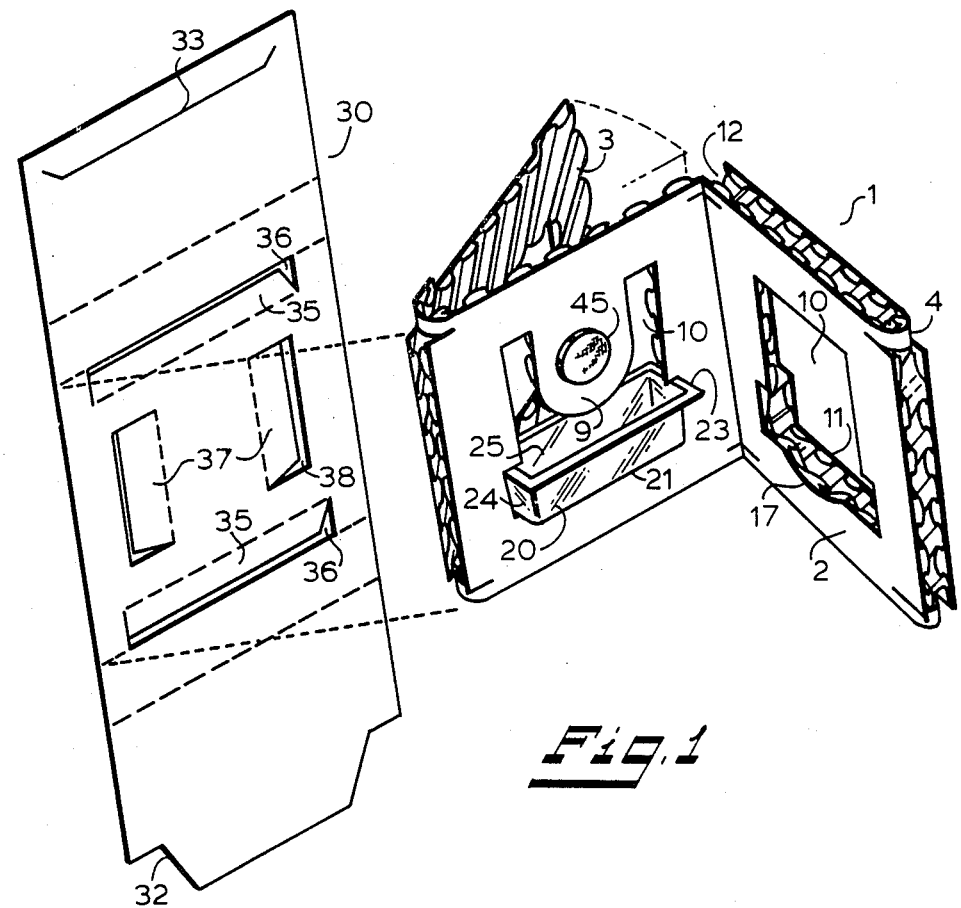
Figure 2:
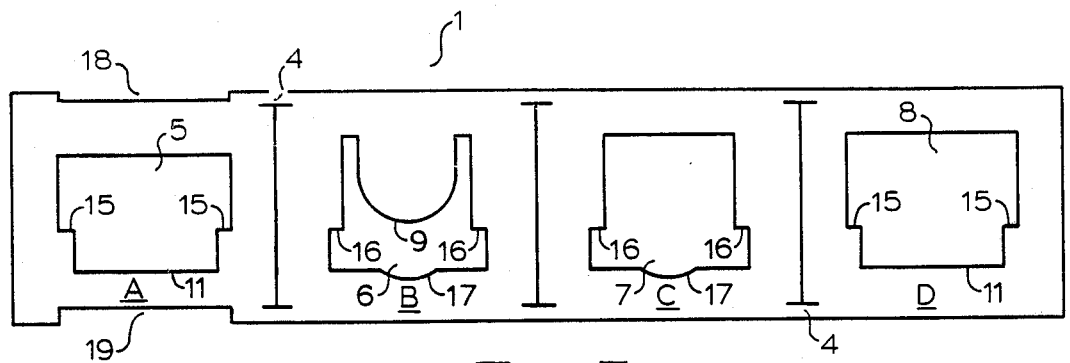
Figure 3:
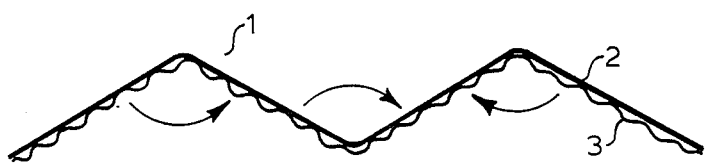
Figure 8:
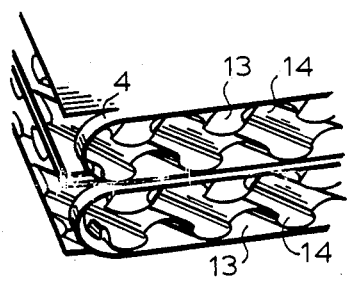

In the preferred embodiment of the invention illustrated in the drawings, the housing device 1 is constructed from single-faced corrugated paperboard having a smooth-faced side 2 and a corrugated side 3. While of course other materials could be used, the paperboard is inexpensive and is conducive to facile manufacture of the trap. As best illustrated in FIG. 2, the housing device is fabricated from a single piece of paperboard comprising four rectangular sections A, B, C, and D serially interconnected by hinges 4. The hinges permit folding of the sections accordionstyle into layers as most clearly illustrated in FIGS. 1 and 3. In this manner, section A becomes the back layer with smooth side 2 facing out, and section D the front layer with smooth side 2 also facing out. Sections A, B, C, and D have cut-outs 5, 6, 7, and 8, respectively, which collectively form a cavity 10 within the interior of the housing device when it is in the folded position as shown in FIG. 1. The lower portions of the cut-outs are shaped to accommodate the pitfall chamber 20 as shown in FIG. 1. Upon insertion of pitfall chamber 20 into the cavity, the bottom 21 is supported by the edges of the paperboard section defining the lower edge 11 of cavity 10. In a preferred embodiment of the invention, pitfall chamber 20 can be provided with a lip 23 protruding outwardly from the upper end of end walls 24. Chamber 20 can thereby be supported by means of the underside of lip 23 resting on shoulders 15 in sections A and D (FIG. 2). Ears 16 in sections B and C, biased against the upper surface of lip 23, interact reciprocally with shoulders 15 in securing the chamber against vertical movement within cavity 10. In the absence of a lip, ears 16 impinge against the rim of mouth 25 defined by upper edges of end walls 24, thereby biasing the underside of chamber 20 against edge 11. When the housing device 1 is folded shut and inserted into jacket 30, lateral movement of the chamber within cavity 10 is restricted by means of the jacket back panel 31 and front panel 39.

It is noted in FIGS. 1 and 5 that the corrugations are oriented diagonally across each section of the housing device. When folded shut, the corrugations of adjacent layers are oriented perpendicular to one another and virtually the entire perimetrical exposure 12 is available for ingress by the insects. The preformed spacings 13 between the corrugated paper and the facing paper of each layer, as well as the interstitial spacings 14 between opposing corrugated surfaces of adjacent layers, define passages for movement of the insects. In each of the layers, most of these passages are intersected by the cavity 10. This permits interlayer (horizontal) movement within housing device 1. The mouth 25 of pitfall chamber 20 is thereby accessible from the exterior by means of the preponderance of the passages within the housing device.

Depressions 17 in the cut-outs 6 and 7 of sections B and C, respectively, jointly form a passage for insects to traverse the trap sections beneath the bottom of the pitfall chamber and thereby facilitate access to the mouth of the chamber.

Tab 9, shown in FIGS. 1 and 2 as a protrusion into cut-out 6 of section B, serves as a support for an insect attractant described in more detail below. When the trap is in its operative conformation and orientation, tab 9 is positioned approximately centrally within cavity 10 and directly above the mouth 25 of pitfall chamber 20. Also, a lure 45, such as a membrane-type or septum-type pheromone lure, can be applied to the tab to further entice the insects to the vicinity of the pitfall chamber mouth 25.

In the preferred embodiment of the invention, an oleaginous substance (hereafter referred to as "oil") is placed in the bottom of the pitfall chamber. The level of oil in the chamber should be sufficient to form a thin coating over the bodies of the insects expected to be captured during the trapping period.

The bottom of the pitfall chamber is optionally fitted with an absorbent pad (not shown) to prevent spillage of the oil from the chamber during handling. Spillage can also be inhibited by extending lip 23 inwardly slightly around the periphery of the mouth 25. When the absorbent pad is used, it should be thoroughly saturated. The type of oil is not critical and may be selected from any of the mineral oils, vegetable oils, or combinations thereof. Many vegetable oils are known to be naturally attractive to insects and can be advantageously selected to perform a dual function. For example, wheat germ, oat, pumpkin seed, and sesame oils are attractive to the khapra beetle. Alternatively, food or other insect attractants known in the art can be added to the oil in order to assist in luring insects to the vicinity of the trap and into the pitfall chamber.

As previously mentioned, pheromones are also effective lures. They can be categorized into two groups: sex pheromones, which are produced by adult females for attracting males; and aggregation pheromones, which are produced by adults, usually males, for attracting both males and females. Pheromones are typically species specific and therefore should be selected in terms of the prevalent insect pest or pests in the trapping area. Of course, synthetic pheromones can be substituted for the natural counterpart. The substance can be applied to any of the surfaces of the housing device or even incorporated into the oil added to the pitfall chamber. In the most preferred embodiment of the invention, the pheromone is applied to tab 9, as previously described. In regard to luring insects to the mouth of the pitfall chamber, cavity 10 serves to allow the pheromone to emanate throughout the multiple layers and passages of the trap. In the same manner, the cavity assists in dispersing volatile attractants from the oil.

Figure 4:
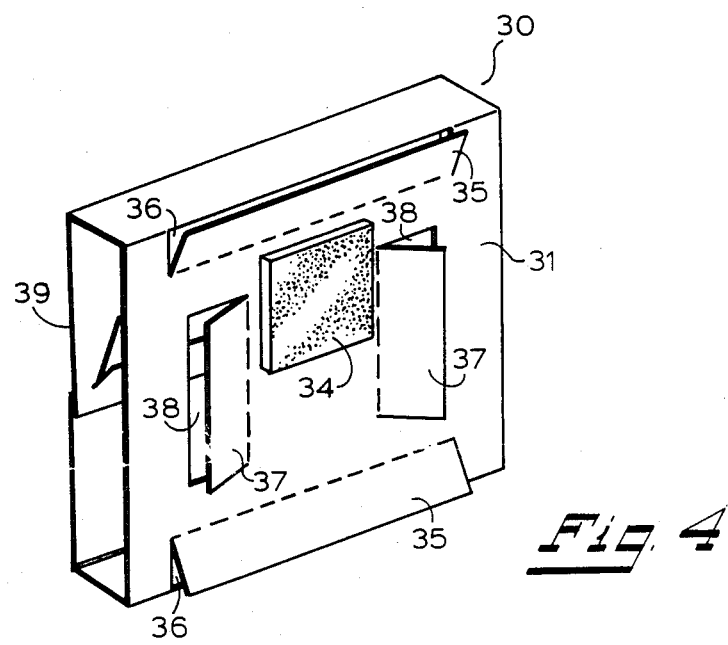

Referring again to FIGS. 1 and 4, the housing device 1 is contained and secured in the folded position by means of a protective jacket 30 which is preferably constructed of moisture-repellent paper or other inexpensive material. The jacket is adapted to wrap around the housing device, essentially sealing the top, bottom, front, and back from the ingress of dust and light, while maintaining exposure of housing perimeter 12 along the side edges for access by insects. The interlocking of jacket tab 32 into slot 33 secures the jacket in place.

The back panel 31 of jacket 30 is adapted to be affixed to a vertical surface by means of a strip of adhesive mounting tape 34 or other conventional means of facile attachment. Panel 31 is also provided with one or more fold-out flap and vent combinations such as the upper and lower horizontal flaps 35 and vents 36 and the right and left vertical flaps 37 and vents 38 illustrated in FIGS. 1 and 4. When the flaps are folded outwardly they ensure intimate contact between the trap and the vertical surface on which the trap is mounted. This arrangement compensates for any displacement of back panel 31 from the surface caused by the thickness of the mounting tape or any irregularities in the surface itself. The flaps 35 and 37 thereby serve as ramps, facilitating access to the interior of housing device 1 through vents 36 and 38. Cut-outs 18 and 19 in section A of the housing device 1 (FIG. 2) coincide with upper and lower vents 36, respectively, so that insects entering the vents have direct access to passages 13 and 14 and cavity 10. Cut-out 18 should be dimensioned so as to extend only part way down vent 36. The result is that the smooth-faced side of section A protruding up into the vent together with the inner side of flap 35 form a V-shaped depression. Dust, chipped paint, and other debris falling from above collect in the depression and do not fall through passages 13 and 14 into the pitfall chamber or other portions of the trap.

In practice, it is envisioned that the trap would be packaged as a kit including the housing device, the pitfall chamber, the optional absorbent pad, the jacket, and sealed containers comprising an appropriate selection of oils and pheromones. At the time of use, the jacket is assembled by folding at the perforations and engaging tab 32 into slot 33. Pheromone is optionally applied to the tab 9 as previously described, and the housing device 1 is folded around the chamber so as to seat the chamber in the lower section of cavity 10. After device 1 is inserted into the assembled jacket, jacket flaps 35 and 37 are opened. The jacket is then affixed by means of the mounting tape 34 to a vertical surface located in a predetermined trapping site. Thereafter, the housing device is partially removed from the jacket by sliding it to one side or the other. Finally, the pitfall chamber 20 is charged with the oil, attractant, or other agent as desired, and the housing device is reinserted into the jacket. Assembly and installation of the trap prior to charging the chamber avoids spillage of oil that might otherwise occur from subsequent handling of the trap. By freshly baiting the trap at the time of assembly, maximum effectiveness is ensured and it is possible to tailor the trap to the species anticipated in the treatment zone. The trap can be periodically examined and serviced by simply sliding the housing device 1 out of the jacket as described above.

This novel invention finds application for virtually all species of insects, both adult and larval, which are physically capable of, and prone to, entry. Principal utility is for stored-product pests, especially those of the order Coleoptera. Without limitation thereto, exemplary pests include *Attagenus unicolor, Trogoderma variabile* (warehouse beetls), *Trogoderma glabrum, T. granarium* (kapra beetle), *T. inclusum, Tribolium castaneum* (red flour beetle), *Tribolium confusum* (confused flour beetle), *Oryzaephilus surinamensis* (sawtooth grain beetle), and *O. mercator* (merchant grain beetle).

Specific applications of the present trap include (1) survey and surveillance programs by industry and by regulatory agencies, (2) monitoring effectiveness of control programs, (3) monitoring point sources of insect activity, such as specific equipment items, (4) establishing phenological patterns of insect activity, (5) monitoring goods in transit, (6) detecting household insects, and (7) insect control in food processing, food storage, and food distribution facilities.

For monitoring purposes, the traps should be placed in areas susceptible to infestation during periods of insect activity; that is, when temperatures exceed about 13° C. (55° F.). Initial placement should be in a grid pattern at intervals of 8-16 meters. Placement should also be in areas with a history of infestation, near suspected sources of contamination, and near likely hiding places. It will be apparent from periodic inspections whether the density of the traps should be increased in particular areas for purposes of insect control. It may also be necessary to replenish the oil and/or attractant at periodic intervals as readily determined by the practitioner.

In operation, the multiple entry points provided by the open side edges 12 of the housing device and the vents on the back panel of the jacket facilitate access to the pitfall chamber. The passages 13 and 14 formed by the corrugations or as otherwise constructed provide both tactile stimuli and concealment, thereby being conducive to entry. In this sense, the housing device is perceived as a shelter, especially by those species exhibiting exposure/hiding diel behavior patterns. The cavity 10 promotes circulation of attractant odors and unrestricted insect movement. Once inside, most insects eventually are lured to, or adventitiously drop into, the pitfall chamber.

Larval and adult insects can approach mouth 25 of the pitfall chamber 20 directly from the jacket flaps 37, as well as from ears 27 and tab 9 overhead. Insects approaching the mouth from the tab are especially prone to accidentally falling into the chamber. When the tab is baited with pheromone, adult males are captured while attempting to reach the tab by climbing over the edge of the pitfall chamber or by slipping off the tab. It has been observed that khapra beetle larvae are primarily captured by slipping off the edge of the chamber. Once inside the chamber, oil is drawn up over the body of the insect by capillary action, thereby coating the spiracles and causing suffocation.

Traps which dispatch insects by suffocation as described above are considered to be "poisonless" in the sense that they do not rely upon toxicants such as contact or stomach poisons for inducing a fatal physiological effect. In an alternate embodiment of the invention, a poison or pathogen can be applied to the bottom of the pitfall chamber in order to kill the insects.

The following examples are intended only to further illustrate the invention and are not intended to limit the scope of the invention which is defined by the claims.

EXAMPLES

Trap Design. Vertical mount traps were constructed according to the design shown in FIGS. 1–5. Each trap consisted of a 7.6×35.6 cm piece of single-face corrugated paper housing, diagonally die cut and with hinges to allow folding into a vertically oriented 4-layer piece ca. 8.9×7.6×1.8 cm thick. Cut-outs in each equally sized section created an inner cavity and allowed insertion, across the bottom, of a 1.8×5.4×1.4 cm deep, clear polyester pitfall chamber vacuum formed from 0.061 mm sheet stock. A downward projecting, rounded tab in one internal section served to position a membrane-type pheromone lure vertically and directly over the pitfall chamber. The assembled trap was enclosed in a jacket die cut from ca. 0.61 mm (0.024 in, or 24 pt) SBS white claycoat paper. The jacket was equipped with two horizontal and two vertical integral rear, hinged flaps that, when properly folded outward, provided direct access to the trap and its interior components and more direct dispersal of pheromone and attractant odors. A 2.54 cm$^2$×ca. 1.6 mm-thick piece of double adhesive foam tape was placed at the top center of the trap back between the two vertical rear flaps and just below the top flap for mounting.

Rearing. Khapra beetle (*T. granarium*) insects were reared on a mixture of wheat bran, wheat germ, and whole wheat flour in a ratio of 7:3:1, which was pre-sieved to pass a 20 mesh sieve. The media was dry sterilized at 70° C. for one hour in canning jars. Stock cultures were set up with 75 adult pairs per 100 g media in the jars, which were then covered by the rim lined by brass screen and filter paper. Cultures were kept on a plastic grid over an oil tray for security. All cultures were kept in an environmental chamber at 30±0.5° C., 50±1% RH under a 12:12 hr light cycle. Insects were removed by sieving through an 18 mesh sieve. Pupae were produced after ca. 28 days, sexed by size, and held in filter paperlined disposable petri dishes in the rearing chamber until used.

Trap Tests. Trap tests were conducted in large stainless steel trays, 0.91 m$^2$×76.2 mm deep, bottom-lined with a single sheet of 0.89 m$^2$, 50-lb Kraft paper taped down around the edges by a continuous strip of 2.54-cm masking tape. Simulated walls, voids, and crevices were made by lining the inside edge with 1.9×6.35 cm pine boards cut to side-length and spaced from the bottom by several 1.5 mm thick metal washers in order to provide ample harborage for released insects. All insects released were allowed to disperse for 24 hr prior to placement of traps. Larval tests were conducted under darkness or red light for counting, and adult male tests were held under a 12:12 photocycle similar to rearing conditions. The ca. 3.6×4.0 m$^2$ test room was kept at ca. 27° C. and 50% RH. Between tests the room air was recirculated through an activated charcoal filter at a rate of 4.15 m$^3$/min (150 cfm) for 1 day to reduce the risk of contamination.

EXAMPLE 1

The vertical mount (VM) trap was directly compared with the horizontal mount (HM) trap described in U.S. Pat. No. 4,581,845 for larval trapping. In each of the four stainless steel trays 100 of the 22-day-old khapra beetle larvae were released (25 per corner) and allowed to disperse for 24 hr. After 24 hr, one VM and one HM trap were placed in each tray against opposite walls. Both traps contained 0.5 ml wheat germ oil per pitfall chamber. Trap counts were made 1, 2, and 5 days after traps were placed and analyzed by the student's t test.

As shown in Table I, the VM trap trapped larvae at a higher rate than the HM trap. The one-day catch was 1.5-fold (t=1.46, 6 df, P=0.194), and after 5 days the catch was 3.4-fold (t=7.07, P=<0.001). Catch was unpredictable for the HM trap, with only 23.8% of the variation explained by time. The traps were disturbed as little as possible during checks, therefore larvae loose in the traps but not in the trays were not counted until the end. The VM trap captured all larvae in the pitfall chamber; the HM trap had numerous larvae loose in the trap but not caught in the pitfall chamber.

TABLE I

| Cumulative Percent of Khapra Beetle Larvae Trapped in Horizontal (HM) or Vertical (VM) Mount Traps | | | |
|---|---|---|---|
| | % Larvae Trapped (± SE) (Cumulative) | | t (6 df) |
| Day | HM Trap | VM Trap | P |
| 1 | 7.25 | 11.00 | 1.46 |
| | (±1.89) | (±1.73) | 0.194 |
| 2 | 8.25 | 19.50 | 4.31 |
| | (±2.32) | (±1.19) | 0.005 |
| 5 | 12.50 | 42.00 | 7.07 |
| | (±2.75) | (±3.14) | <0.001 |
| 5$^a$ | 17.25 | 42.75 | 5.73 |
| | (±3.01) | (±3.28) | 0.001 |

$^a$Values represent total of larvae caught in pitfall plus larvae loose in trap.

EXAMPLE 2

A comparison of adult captures for the VM versus the HM design was made by fitting a commercial female sex pheromone septum-type lure used with the HM trap into the VM trap, since both traps needed the same lure for unbiased comparison. The septum was secured to the downwardly projecting tab in the inner cavity. In each stainless steel tray, 50 of the 5- to 7-day-old males were released and allowed to disperse for 24 hr. After 24 hr, either a VM or a HM trap was placed in the center of each of the four diagonally arranged trays. Male catch was counted after 1, 2, 3, and 6 days. The entire experiment was repeated again for a total of four replicates per trap type.

As shown in Table II, the VM trap initially caught 4.9-fold more males than the HM trap after 1 day (t=4.89, 6 df, P=0.003) and after 6 days the difference was still 1.7-fold (t=7.77, P<0.001). The VM trap captured all males in the pitfall chamber, whereas an additional 14% of males remained free inside the HM trap.

EXAMPLE 3

The effect of the hinged-back jacket flaps on larval catch of wall-mounted traps was tested by mounting VM traps ca. 4 mm above the floor of the stainless steel trays in the center of each side with open or closed traps alternating. A total of 200 larvae, 50 in each corner, were released 24 hr prior to trap placement. Counts were taken after 1, 2, and 5 days by removing and replacing each pitfall chamber.

As shown in Table III, traps with open flaps in contact with the wall caught larvae, whereas traps with flaps not deployed were not effective. These results indicate that larvae were unable to negotiate the small gap between the trap jacket and the wall created by the mounting tape.

TABLE II

Cumulative Percent of Khapra Beetle Males Trapped in Horizontal (HM) or Vertical (VM) Mount Traps

| Day | % Males Trapped (± SE) (Cumulative) | | t (6 df) |
|---|---|---|---|
| | HM Trap | VM Trap | P |
| 1 | 12.00 (±5.03) | 59.00 (±8.19) | 4.89 0.003 |
| 2 | 25.00 (±8.60) | 77.00 (±5.74) | 5.20 0.002 |
| 3 | 39.50 (±7.97) | 87.50 (±2.22) | 5.80 0.001 |
| 6 | 56.55 (±4.99) | 95.50 (±0.50) | 7.77 <0.001 |
| 6[a] | 70.50 (±1.50) | 95.50 (±0.50) | 15.81 <0.001 |

[a]Values represent total of males caught in pitfall plus males loose in trap.

TABLE III

Cumulative Percent of Khapra Beetle Larvae Trapped in Vertical Mount (VM) Traps Mounted 4.0 mm Above Floor with All Flaps Either Closed or Open

| Day | % Larvae Trapped (± SE) (Cumulative) | | t (14 df) |
|---|---|---|---|
| | Closed Flaps | Open Flaps | P |
| 1 | 0.00 (0.00) | 12.75 (±1.19) | n.a. |
| 2 | 0.13 (±0.08) | 17.43 (±1.83) | 9.46 <0.001 |
| 5 | 0.50 (±0.19) | 32.75 (±1.98) | 16.20 <0.001 |

EXAMPLE 4

To confirm the significance of the hinged-back jacket flaps to the overall catch, Example 3 was repeated using open or closed traps mounted on the wall but in contact with the floor. Traps with closed flaps were able to catch larvae, but traps with open rear flaps were able to capture larvae at a higher rate. After one day the difference was 1.25-fold (t=1.60, 14 df, P=0.132), and by 5 days the difference was 1.33-fold (t=2.10, P=0.055).

As shown in Table IV, these results indicate that wall contact is important, and that many insects crawl up vertical surfaces and enter the trap from behind.

EXAMPLE 5

The effect of the hinged-back jacket flaps on adult male catch was tested by mounting open or closed VM traps fitted with pheromone septa lures as in Example 2 ca. 4 mm above the floor of the stainless steel trays. Each tray had one of each type trap arranged on opposite walls and contained 100 of the 5- to 8-day-old males, which had been released 24 hr previously.

As shown in Table V, few males were able to cross the tape gap. One replicate had to be discarded, since a bulge in the paper floor of the tray allowed males to enter the closed-flap trap even though the contact was only at one corner of the trap. Traps with flaps open caught 50.67±8.67% S.E. of released males after 1 day, and 86.0±6.43% S.E. after 6 days.

EXAMPLE 6

The ability of VM traps with pheromone lures to catch males when the traps were mounted significantly above the floor level was tested. Males were released (90 per tray) and allowed to disperse 24 hr. In addition to the normal wall boards, a ca. $1.9 \times 45$ $cm^2$ board was set on edge in the center of each tray. One trap was affixed to each vertical board per tray, two at floor level and two with the bottom 20 cm above the floor (wall traps). Trap counts were made after 1, 2, 3, and 6 days. The experiment was repeated, for a total of four replicates per height.

TABLE IV

Cumulative Percent of Khapra Beetle Larvae Trapped in Vertical Mount (VM) Traps Mounted at Floor Level with All Flaps Either Open or Closed

| Day | % Larvae Trapped (± SE) (Cumulative) | | t (14 df) |
|---|---|---|---|
| | Closed Flaps | Open Flaps | P |
| 1 | 7.38 (±0.93) | 9.25 (±0.71) | 1.60 0.132 |
| 2 | 11.00 (±1.32) | 13.06 (±0.99) | 1.25 0.232 |
| 5 | 15.88 (±1.66) | 21.06 (±1.83) | 2.10 0.055 |

TABLE V

Cumulative Percent of Khapra Beetle Males Trapped in Vertical Mount (VM) Traps Mounted 4.0 mm Above Floor with All Flaps Either Closed or Opened

| Day | % Males Trapped (± SE) (Cumulative) | | t (4 df) |
|---|---|---|---|
| | Closed Flaps | Open Flaps | P |
| 1 | 5.00 (±2.01) | 50.67 (±8.67) | 5.12 0.007 |
| 2 | 6.00 (±2.65) | 73.67 (±8.29) | 7.77 0.001 |
| 3 | 7.67 (±3.48) | 80.00 (±8.62) | 7.79 0.001 |
| 6 | 10.33 (±5.24) | 86.00 (±6.43) | 9.12 0.001 |

As shown in Table VI, traps mounted 20 cm above the floor had a lower initial male catch than floor level traps (t=2.04, 6 df, P=0.088). The wall traps caught 44.06±5.26% S.E. of males released, whereas floor level traps caught 63.48±7.91% S.E. after 1 day; but, after 6 days, over 94 or 93% of released males were trapped by floor level or wall traps, respectively (t=0.44, P=0.675). Catches by wall traps had, in effect, a 1-day lag time.

It is understood that the foregoing detailed description is given merely by way of illustration and that modification and variations may be made therein without departing from the spirit and scope of the invention.

TABLE VI

Cumulative Percent of Khapra Beetle Males Trapped in Vertical Mount (VM) Traps Mounted at Floor Level or at 20 cm Above the Floor, with All Flaps Open

| Day | % Males Trapped (± SE) (Cumulative) | | t (6 df) |
|---|---|---|---|
| | +20 cm Height | Floor Level | P |
| 1 | 44.06 (±5.26) | 63.44 (±7.91) | 2.04 0.088 |
| 2 | 66.56 (±3.69) | 78.13 (±7.17) | 1.43 0.202 |
| 3 | 78.13 | 86.56 | 1.27 |

TABLE VI-continued

Cumulative Percent of Khapra Beetle Males
Trapped in Vertical Mount (VM) Traps Mounted at Floor
Level or at 20 cm Above the Floor, with All Flaps Open

| Day | % Males Trapped (± SE) (Cumulative) | | t (6 df) P |
|---|---|---|---|
| | +20 cm Height | Floor Level | |
| | (±3.48) | (±8.62) | 0.252 |
| 6 | 93.13 | 94.38 | 0.44 |
| | (±2.42) | (±1.48) | 0.675 |

I claim:

1. A vertical mount insect trap adapted to be secured to a vertical surface comprising a housing device, a pitfall chamber substantially concealed within the housing device for capturing insects and having a mouth at the top thereof, a plurality of passages adapted to render the mouth of the pitfall chamber accessible to the insects from the vertical surface, an attractant for the insects in the locus of the pitfall chamber, and a jacket adapted to at least partially enwrap the housing device the back panel of the jacket to be mounted against the vertical surface having directional flaps which provide direct access to vents that lead to the plurality of passages or directly to the pitfall chamber while providing access by said insects to the passages from the vertical surface.

2. A trap as described in claim 1 wherein the housing device comprises multiple layers of corrugated material oriented in the vertical position when the trap is mounted on the vertical surface, said layers arranged so as to form said plurality of passages.

3. A trap as described in claim 2 wherein the corrugations of adjacent layers of the corrugated material are oriented at substantially 90 degree to one another.

4. A trap as described in claim 3 wherein each layer is hinged to each adjacent layer.

5. A trap as described in claim 4 wherein the number of layers is four.

6. A trap as described in claim 5 wherein the corrugated material is paper.

7. A trap as described in claim 2 wherein said jacket is removable and is adapted to rigidly secure the multiple layers of corrugated material against one another.

8. A trap as described in claim 1 and further comprising a sufficient amount of an agent in said chamber for sequestering or eventually killing insects entering the chamber.

9. A kit for a vertical mount insect trap adapted to be secured to a vertical surface comprising:
   a. a housing device fabricated from single-faced corrugated paper having a smooth side and a corrugated side, wherein said paper is shaped into four substantially rectangular interconnected sections such that the corrugations are oriented diagonally across each section, and wherein the paper is adapted to be folded accordion-style, whereby each section forms one of four layers with the smooth side of each of the first and fourth layers defining a side on the exterior of said device;
   b. a pitfall chamber;
   c. a cavity within the housing device adapted to securely receive the pitfall chamber;
   d. an insect attractant for application to said trap;
   e. an agent for sequestering or eventually killing insects for placement within the pitfall chamber;
   f. a jacket adapted to rigidly secure the housing device in a folded position the back panel of the jacket to be mounted against the vertical surface having directional flaps which provide direct access to vents that lead to the plurality of passages or directly to the pitfall chamber, the jacket including at least one combination of a vent and an outwardly protruding flap contiguous to the vent, wherein the flap is adapted to contact the vertical surface for facilitating access of the insects to said passages from the surface; the back panel of the jacket to be mounted against the vertical surface having directional flaps which provide direct access to vents that lead to the plurality of passages or directly to the pitfall chamber and
   g. means for affixing the jacket to the vertical surface.

10. A kit as described in claim 9 wherein the jacket is adapted to permit repeated insertion and removal of the housing device without removing the jacket from the vertical surface.

11. A kit as described in claim 9 wherein said agent for sequestering or eventually killing insects is an oleaginous substance.

12. A kit as described in claim 9 wherein said agent for sequestering or eventually killing insects is an insect pathogen.

13. A kit as described in claim 9 wherein said agent for sequestering or eventually killing insects is an insect poison.

14. A kit as described in claim 9 wherein said attractant is a pheromone.

* * * * *